United States Patent
Jafari et al.

(10) Patent No.: US 12,298,040 B2
(45) Date of Patent: May 13, 2025

(54) FASTENING DEVICE FOR COUPLING DUCTS OF HEAT EXCHANGER

(71) Applicant: Rheem Manufacturing Company, Atlanta, GA (US)

(72) Inventors: Arash Asl Jafari, Oxnard, CA (US); Miguel Mendoza, Oxnard, CA (US); Babak Bagheri, Oxnard, CA (US); Christina Miller, Oxnard, CA (US); Aaron Abraham Weaver, Stoystown, PA (US)

(73) Assignee: Rheem Manufacturing Company, Atlanta, GA (US)

( * ) Notice: Subject to any disclaimer, the term of this patent is extended or adjusted under 35 U.S.C. 154(b) by 209 days.

(21) Appl. No.: 18/099,872

(22) Filed: Jan. 20, 2023

(65) Prior Publication Data
US 2023/0243553 A1  Aug. 3, 2023

Related U.S. Application Data

(60) Provisional application No. 63/304,252, filed on Jan. 28, 2022.

(51) Int. Cl.
*F16J 13/06* (2006.01)
*F24H 3/06* (2022.01)

(52) U.S. Cl.
CPC .................... *F24H 3/065* (2013.01)

(58) Field of Classification Search
CPC .... F16B 2/06; F16B 5/121; F16B 2/10; F16B 2/18; F16B 2/065; F16J 13/06;
(Continued)

(56) References Cited

U.S. PATENT DOCUMENTS

| 4,157,146 A * | 6/1979 | Svenson | F16J 13/24 292/257 |
| 6,401,958 B1 * | 6/2002 | Foss | F16J 13/06 220/320 |
| 2019/0285120 A1 | 9/2019 | Sgambati et al. | |

FOREIGN PATENT DOCUMENTS

| DE | 102019106201 A1 | 9/2019 |
| EP | 3222957 A1 * | 9/2017 |
| FR | 2593567 A1 * | 7/1987 |

OTHER PUBLICATIONS

PCT, "International Search Report & Written Opinion" Application No. PCT/US2023/011202, dated Apr. 5, 2023 (10 pp.).

(Continued)

*Primary Examiner* — Harry E Arant
(74) *Attorney, Agent, or Firm* — Eversheds Sutherland (US) LLP

(57) ABSTRACT

A fastening device for fluid tightly coupling a first duct body and a second duct body of a heat exchanger is provided. The fastening device includes a support member to couple with a connecting edge of the first duct body. The support member includes a pivot pin and a locking device disposed at an offset distance from the pivot pin along a radial axis of the fastening device. The fastening device further includes a pivot arm having a first end to engage with the pivot pin and a second end to engage with a flange of the second duct body. The locking device engages with the pivot arm and move the second end of the pivot arm relative to the pivot pin to fluid tightly engage the flange of the second duct body with the connecting edge of the first duct body.

20 Claims, 4 Drawing Sheets

(58) Field of Classification Search
CPC ......... F16J 13/00; F16J 13/065; F28F 9/0219; F28F 2275/146; F28F 2275/20; F24H 3/065; F24H 3/06
See application file for complete search history.

(56) References Cited

OTHER PUBLICATIONS

PCT, "International Preliminary Report on Patentability" Application No. PCT/US2023/011202, dated Aug. 8, 2024 (8 pp.).

* cited by examiner

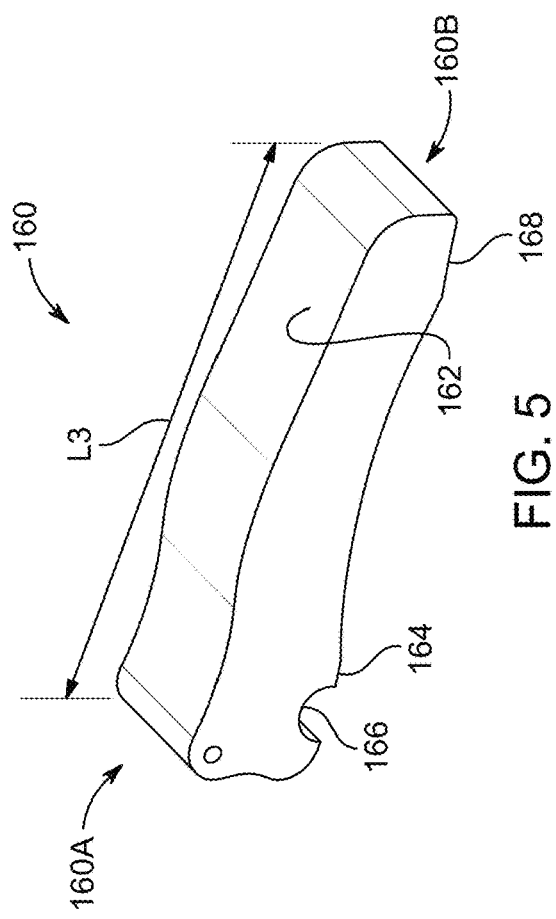
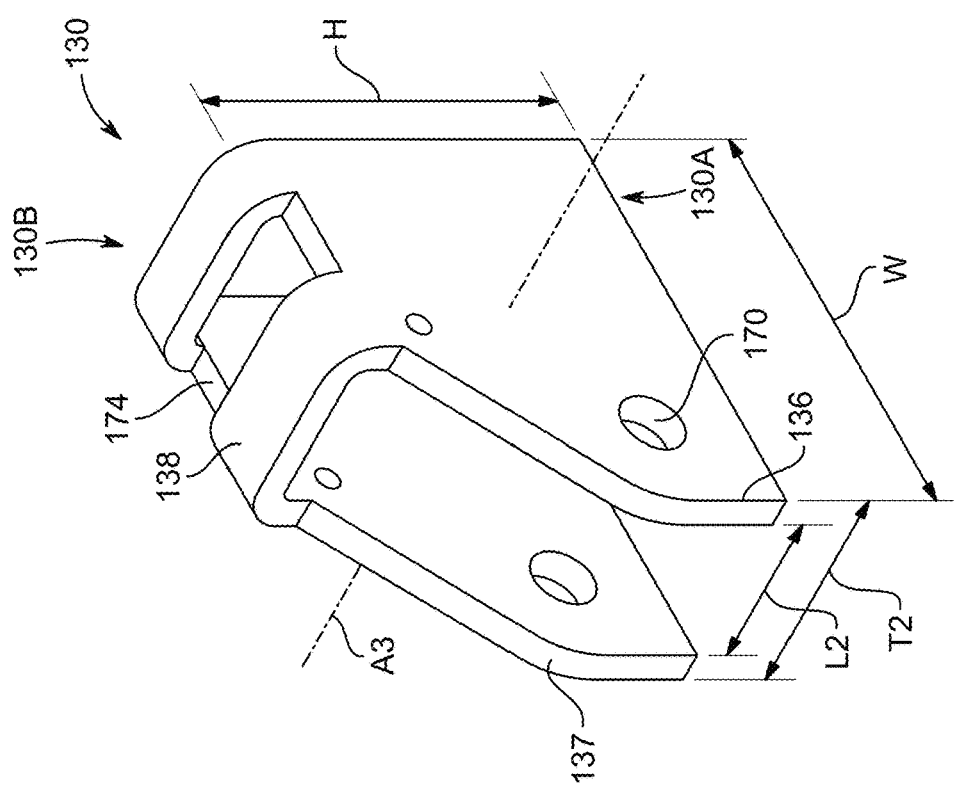

FASTENING DEVICE FOR COUPLING DUCTS OF HEAT EXCHANGER

CROSS-REFERENCE TO RELATED APPLICATION

This application claims the benefit of U.S. Provisional Application No. 63/304,252, filed Jan. 28, 2022, the entirety of which is hereby incorporated by reference.

TECHNICAL FIELD

The present disclosure relates, in general, to fastening devices, and more specifically relates to a fastening device for coupling two ducts of a heat exchanger.

BACKGROUND

Air handling applications, such as heating, ventilation, and air conditioning (HVAC), include units or devices for conditioning air such as air conditioners (AC), heat pumps, and furnaces for generating hot or cold air as per the requirement in a closed space. The conditioned air is routed through ductwork to facilitate cooling or heating of the closed space. The ductwork includes plenum boxes which are located on either side of a heat exchanger of the air handling unit(s). The plenum boxes are tightly coupled in fluid communication to a body of the heat exchanger using fastening members such as bolts and nuts or another known fastening method. One known method of coupling the plenum boxes with the heat exchanger is a stud weld method. In this method, a threaded stud is welded to the body of the heat exchanger and the plenum box is coupled to the heat exchanger using the threaded stud and nuts. However, the stud weld method is susceptible to failing prematurely due to thermal stress. Further, over-tightening due to operator error may also cause premature failure of the stud weld. Moreover, the stud weld method is unreliable and risky as the threaded stud could break if appropriate torque is not applied to the threaded stud while coupling the plenum box with the heat exchanger.

Another known method of coupling the plenum boxes with the heat exchanger uses bolts and nuts. A U-shape clamp may be attached to an outer circumference of the body of the heat exchanger. Further, the bolts and nuts may be used to couple the plenum boxes with the U-shape clamp of the heat exchanger. However, applying load on outer ring of the plenum boxes may cause buckling, or bowing, thereof which may in turn cause sealing of combustion chamber cumbersome. Hence, there is a need to develop a fastening device for coupling the plenum boxes with the heat exchanger which is less sensitive to operator error and is less susceptible to impact due to thermal stress.

SUMMARY

According to one aspect of the present disclosure, a fastening device for fluid tightly coupling a first duct body and a second duct body of a heat exchanger is disclosed. The fastening device includes a support member configured to couple with a connecting edge of the first duct body. In an embodiment, the support member is welded to the connecting edge of the first duct body. The support member includes a pivot pin coupled to the support member. The support member further includes a locking device coupled to the support member and disposed at an offset distance from the pivot pin along a radial axis of the fastening device. In some embodiments, the locking device includes a locking member having a head end and a tail end, and a coupling member configured to movably couple the locking member with the support member. The head end of the locking member is operated to engage the tail end of the locking member with the pivot arm. In an embodiment, the locking member includes a bolt, and the coupling member includes a pair of nuts.

In some embodiments, the support member includes a bottom end configured to couple with the pivot pin and a top end configured to couple with the locking device. The locking device is configured to move along a longitudinal axis perpendicular to the radial axis of the fastening device. In some embodiments, the support member includes a first leg and a second leg disposed at a lateral distance to the first leg along a transverse axis perpendicular to the radial axis. The first leg and the second leg are configured to couple with the connecting edge of the first duct body. The support member further includes a shoulder extending between the first leg and the second leg along the transverse axis, and the locking device is movably coupled to the shoulder. In an embodiment, the shoulder includes a slot configured to movably support the locking device therewith. In an embodiment, each of the first leg and the second leg defines a hole to slidably receive the pivot pin therethrough, and the pivot pin is removably coupled to the support member using a cotter pin.

The fastening device further includes a pivot arm having a first end configured to engage with the pivot pin and a second end configured to engage with a flange of the second duct body. The locking device is configured to engage with the pivot arm and move the second end of the pivot arm relative to the pivot pin to fluid tightly engage the flange of the second duct body with the connecting edge of the first duct body. In some embodiments, the pivot arm is disposed between the first leg and the second leg and movably coupled to the pivot pin, and the lateral distance between the first leg and the second leg is greater than a width of the pivot arm. In some embodiments, the first end of the pivot arm defines a curved indentation at a bottom surface thereof having a diameter equal to or greater than a diameter of the pivot pin, and the curved indentation of the pivot arm is movably engaged with the pivot pin. In some embodiments, the second end of the pivot arm defines a flat surface configured to engage with a top surface of the flange of the second duct body when the first duct body is coupled with the second duct body.

According to another aspect of the present disclosure, a heat exchanger is disclosed. The heat exchanger includes a shell, a plenum configured to couple with the shell, and a plurality of fastening devices configured to fluid tightly engage the plenum with the shell. In an embodiment, each of the plurality of fastening devices is coupled to a connecting edge of the shell at equal distance. Each of the plurality of fastening devices includes a support member configured to couple with the shell. In an embodiment, the support member of each of the plurality of fastening devices is welded to the connecting edge of the shell. In some embodiments, the connecting edge of the shell includes an outer peripheral edge and an inner peripheral edge, and the plurality of fastening devices is coupled to the connecting edge proximate the outer peripheral edge thereof. In some embodiments, the plenum includes a flange having a peripheral edge portion configured to engage with a surface of the connecting edge proximate the inner peripheral edge thereof.

The support member includes a pivot pin coupled to the support member, and a locking device coupled to the support member and disposed at an offset distance from the pivot pin along a radial axis of the fastening device. The fastening device further includes a pivot arm having a first end configured to engage with the pivot pin and a second end configured to engage with the plenum. The locking device is configured to engage with the pivot arm and move the second end of the pivot arm relative to the pivot pin to fluid tightly engage the plenum with the shell. In some embodiments, the first end of the pivot arm defines a curved indentation configured to movably engage with the pivot pin and the second end of the pivot arm is configured to engage with the flange of the plenum. The locking device is configured to move the flange of the plenum towards the surface of the connecting edge using the pivot arm to achieve fluid tight connection between the shell and the plenum. In some embodiments, the heat exchanger includes a gasket disposed between the flange of the plenum and the connecting edge of the shell.

These and other aspects and feature of non-limiting embodiments of the present disclosure will become apparent to those skilled in the art upon review of the following description of specific non-limiting embodiments of the disclosure in conjunction with the accompanying drawings.

BRIEF DESCRIPTION OF THE DRAWINGS

A better understanding of embodiments of the present disclosure (including alternatives and/or variations thereof) may be obtained with reference to the detailed description of the embodiments along with the following drawings, in which:

FIG. 4 is a perspective view of a supporting member of the fastening device, according to an embodiment of the present disclosure;

FIG. 5 is a perspective view of a pivot arm of the fastening device, according to an embodiment of the present disclosure.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Figure 1:
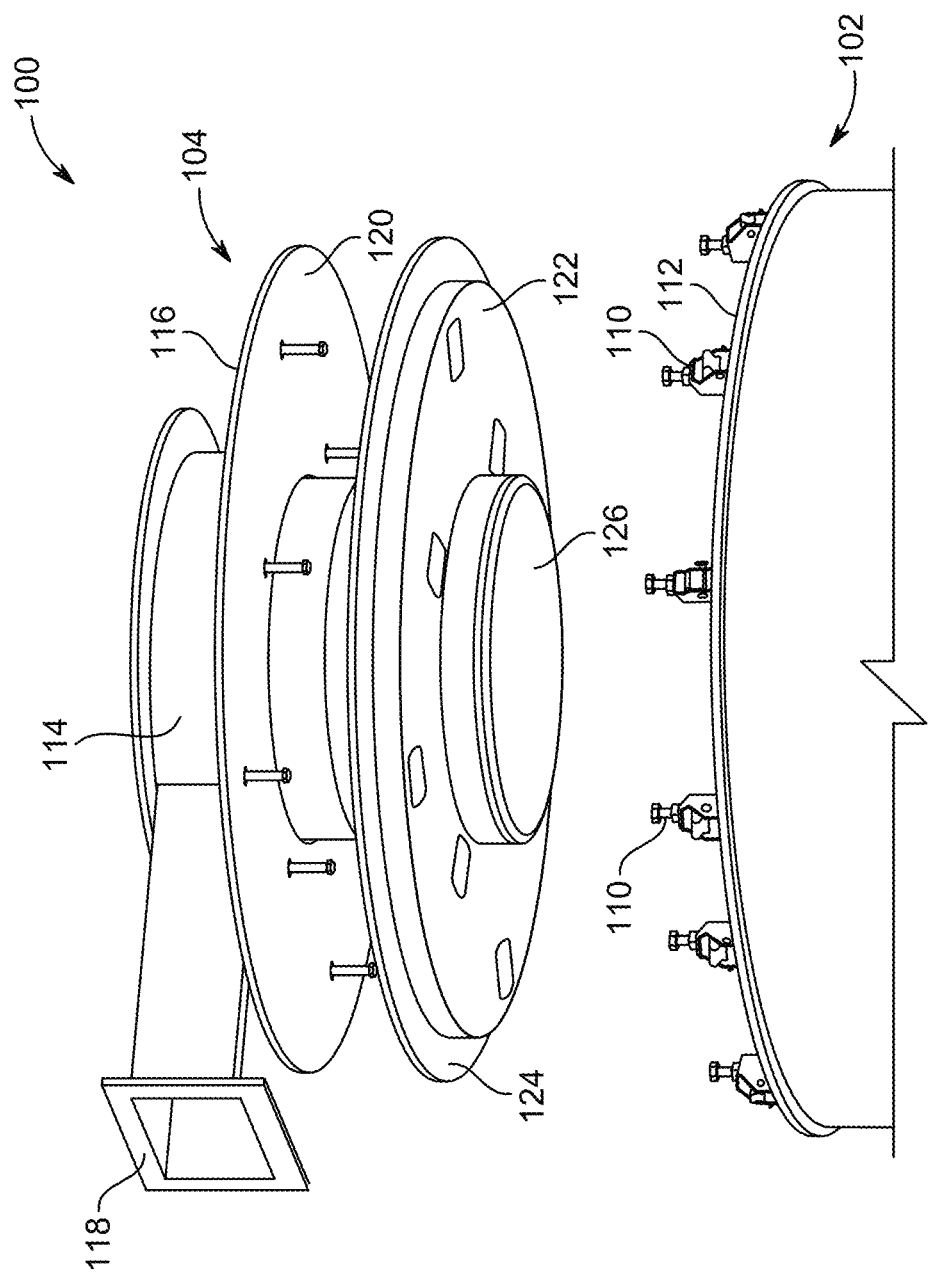
FIG. 1 is an exploded view of a heat exchanger showing a shell and a plenum thereof, according to an embodiment of the present disclosure.

Referring to FIG. 1, a partial exploded view of a heat exchanger 100 is illustrated, according to an embodiment of the present disclosure. The heat exchanger 100 includes a shell 102 and a plenum 104 configured to couple with the shell 102. Typically, a heat exchanger may include an inlet plenum and an outlet plenum attached to a shell to receive and expel, respectively, a first heat transfer fluid such as air. For illustration, and without limiting the scope of the present disclosure, one plenum 104 is shown and described in detail herein below, although one of skill in the art will understand that other designs and embodiments of plenums may be used in conjunction with the described fastening means. In an embodiment, the shell 102 may be a cylindrical body. The shell 102 may enclose a plurality of tubes to allow flow of a second heat transfer fluid and may include an inlet port and an outlet port to receive and expel, respectively, the second heat transfer fluid. As shown in FIG. 1, the heat exchanger 100 further includes a plurality of fastening devices 110 configured to fluid tightly engage the plenum 104 with the shell 102. Particularly, the plurality of fastening devices 110 is coupled to a connecting edge 112 of the shell 102. In some embodiments, each of the plurality of fastening devices 110 is coupled to the connecting edge 112 of the shell 102 at equal distance between each pair of adjacent fastening devices 110. Distance between two adjacent fastening devices 110 may be defined based on various design parameters including, but not limited to, a diameter of the shell 102, load carrying capacity of the heat exchanger 100 in terms of temperature and pressure, and dimensional specifications of the connecting edge 112 of the shell 102 and the plenum 104.

The plenum 104 includes a hollow body 114 configured to fluidly communicate with the shell 102, and a flange 116 extending from and around the hollow body 114 configured to engage with the connecting edge 112 of the shell 102. The hollow body 114 defines an opening 118 configured to receive or expel heat transfer fluid such as air. In an embodiment, the flange 116 has a circular shape having a peripheral edge portion 120 configured to engage with the connecting edge 112 of the shell 102. The flange 116 has an outer diameter defined by the peripheral edge portion 120, which is smaller than an outer diameter of the shell 102 defined by the connecting edge 112.

The heat exchanger 100 further includes a refractory 122 and a gasket 124 disposed between the shell 102 and the plenum 104. The gasket 124 has a circular shape having an outer diameter equal to or larger than the outer diameter of the flange 116 such that the flange 116 of the plenum 104 is fluid tightly engaged with the connecting edge 112 of the shell 102. The gasket 124 facilitates fluid tight sealing between the shell 102 and the plenum 104. The refractory 122 is disposed between the gasket 124 and the connecting edge 112 of the shell 102 to prevent any damage or decomposition to heat exchanger elements due to high temperature or high pressure. The refractory 122 is coupled to the flange 116 of the plenum 104 using fastening members such as bolts and nuts. The heat exchanger 100 further includes a burner 126 disposed at a center of the refractory 122.

Figure 3:
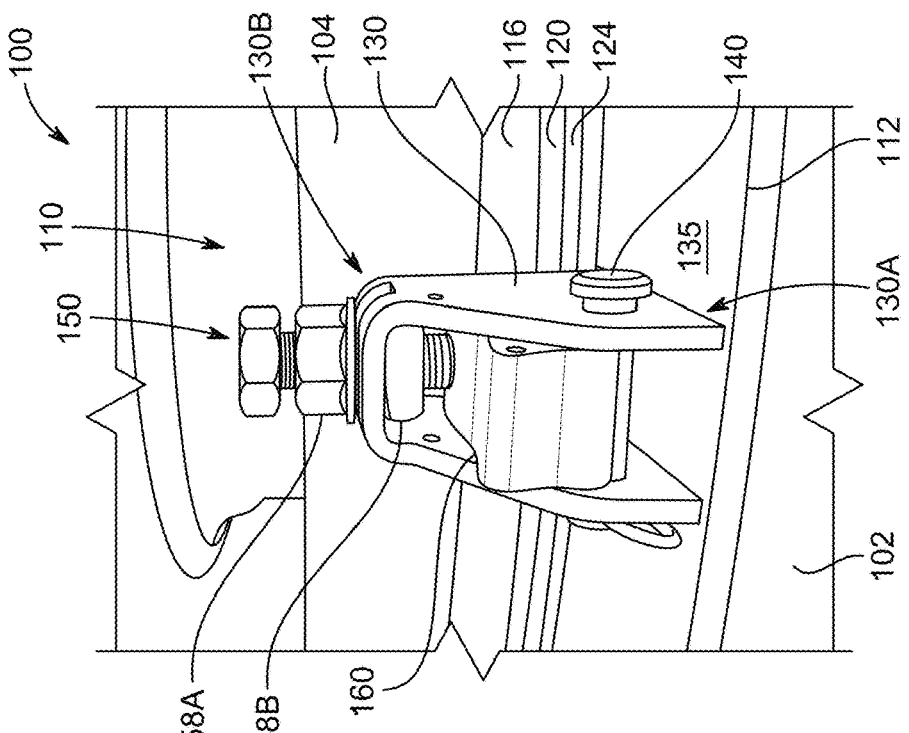
FIG. 3 is a rear perspective view of the fastening device of the heat exchanger, according to an embodiment of the present disclosure.
Figure 2:
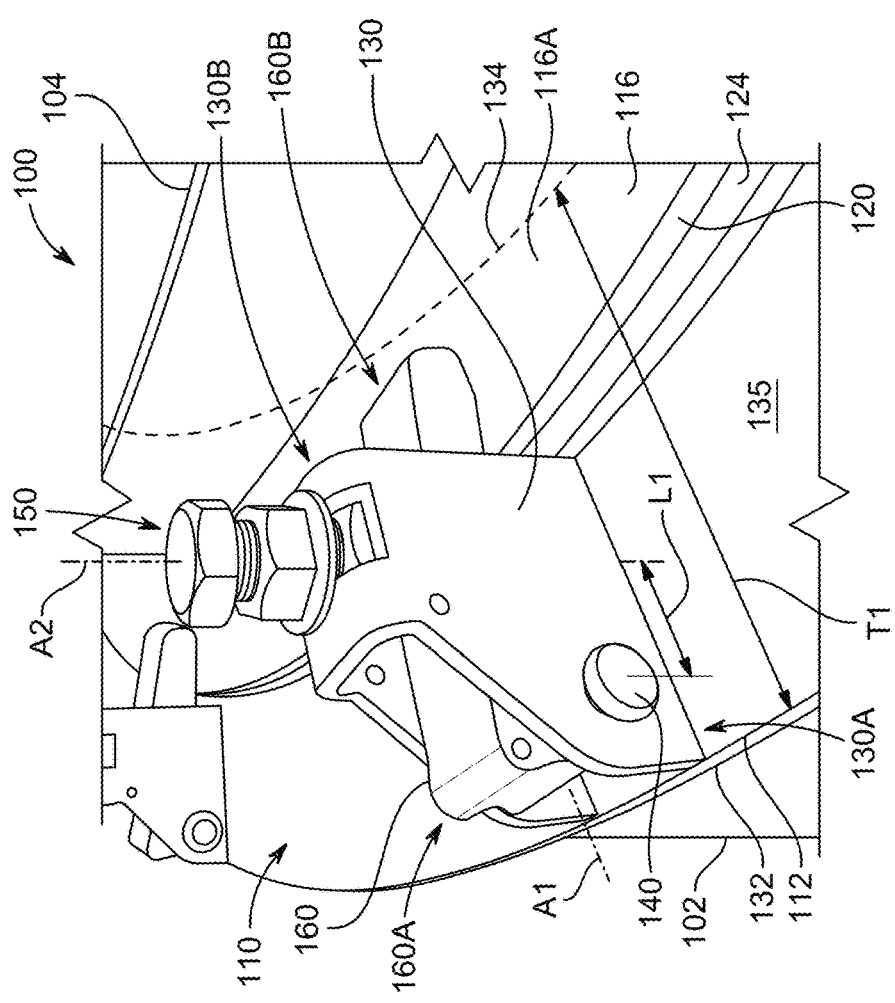
FIG. 2 is a side perspective view of a fastening device of the heat exchanger, according to an embodiment of the present disclosure.

Referring to FIG. 2 and FIG. 3, a side perspective view and a rear perspective view, respectively, of the fastening device 110 are illustrated, according to various embodiments of the present disclosure. The fastening device 110 is configured to tightly couple the shell 102, which is alternatively referred to as 'the first duct body 102', and the plenum 104, which is alternatively referred to as 'the second duct body 104', of the heat exchanger 100, in fluid communication. Referring to FIG. 1 through FIG. 3, each fastening device 110 includes a support member 130 configured to couple with the connecting edge 112 of the shell 102. The connecting edge 112 of the shell 102 includes an outer peripheral edge 132 and an inner peripheral edge 134, and has a thickness 'T1' defined therebetween. The plurality of fastening devices 110 is coupled to the connecting edge 112 proximate the outer peripheral edge 132 thereof and the peripheral edge portion 120 of the flange 116 is configured to engage with a surface 135 of the connecting edge 112 proximate the inner peripheral edge 134 thereof.

In one embodiment, the support member 130 may be welded to the connecting edge 112 of the shell 102. In some embodiments, the support member 130 may be coupled to the connecting edge 112 of the shell 102 using fastening members including, but not limited to, bolts and nuts. Each support member 130 includes a pivot pin 140 and a locking device 150 removably coupled to the support member 130. In some embodiments, the support member 130 includes a bottom end 130A configured to couple with the pivot pin 140 and a top end 130B configured to couple with the locking device 150. More particularly, the locking device 150 is disposed at an offset distance 'L1' from the pivot pin 140 along a radial axis 'A1' of the fastening device 110. The radial axis 'A1' of the fastening device 110, in other words, may be defined as an axis line of the fastening device 110 that extends along a diametrical line of the shell 102. Further, the locking device 150 is configured to move along a longitudinal axis 'A2' perpendicular to the radial axis 'A1' of the fastening device 110. The longitudinal axis 'A2' of the fastening device 110, in other words, may be defined as an axis line of the fastening device 110 that is parallel to a longitudinal axis of the shell 102. The fastening device 110 further includes a pivot arm 160 movably engaged with the pivot pin 140. The pivot arm 160 has a first end 160A configured to engage with the pivot pin 140 and a second end 160B configured to engage with the flange 116 of the plenum 104. The locking device 150 coupled to the support member 130 is configured to engage with the pivot arm 160 and move the second end 160B of the pivot arm 160 relative to the pivot pin 140 to fluid tightly engage the flange 116 of the plenum 104 with the connecting edge 112 of the shell 102.

Referring to FIG. 4, a perspective view of the support member 130 is illustrated, according to an embodiment of the present disclosure. The support member 130 includes a first leg 136 and a second leg 137 disposed at a lateral distance 'L2' to the first leg 136 along a transverse axis 'A3'. The transverse axis 'A3' is perpendicular to the radial axis 'A1' and the longitudinal axis 'A2' of the fastening device 110. The first leg 136 and the second leg 137 are configured to couple with the connecting edge 112 of the shell 102. As shown in FIG. 4, each of the first leg 136 and the second leg 137 is in the form of a plate having a width 'W' less than the thickness 'T1' of the connecting edge 112 of the shell 102. The first leg 136 and the second leg 137 are parallelly disposed at the lateral distance 'L2' to define a thickness 'T2' of the fastening device 110. As such, the lateral distance 'L2' between the first leg 136 and the second leg 137 may be equal to or less than the thickness 'T2' of the fastening device 110. Each of the first leg 136 and the second leg 137 includes a bottom end and a top end, which are alternatively referred to as the bottom end 130A and the top end 130B, respectively, of the support member 130. The support member 130 has a height 'H' defined between the bottom end 130A and the top end 130B thereof. Further, each of the first leg 136 and the second leg 137 has a front end and a rear end defining the width 'W'. Various dimensional specifications such as the width 'W', the thickness 'T2', and the height 'H' may be defined based on various design parameters including, but not limited to, the thickness 'T1' of the connecting edge 112, the load carrying capacity of the heat exchanger 100 in terms of temperature and pressure, and dimensional specifications of the flange 116 of the plenum 104.

The support member 130 further includes a shoulder 138 extending between the first leg 136 and the second leg 137 along the transverse axis 'A3'. Particularly, the shoulder 138 is disposed at the top ends 130B of the first leg 136 and the second leg 137. In one embodiment, the first leg 136, the second leg 137, and the shoulder 138 may be formed as an integral component from a single plate. In an alternate embodiment, the first leg 136, the second leg 137, and the shoulder 138 may be formed as individual components and assembled using various fastenings methods known in the art. The support member 130 may be made from a material selected from a metal or metal alloy. The shoulder 138 is configured to movably support the locking device 150. More particularly, the locking device 150 is movably and removably coupled to the shoulder 138.

Referring to FIG. 5, a perspective view of the pivot arm 160 of the fastening device 110 is illustrated, according to an embodiment of the present disclosure. The pivot arm 160 includes the first end 160A configured to engage with the pivot pin 140 and the second end 160B configured to engage with the flange 116 of the plenum 104. The pivot arm 160 has a length 'L3' defined between the first end 160A and the second end 160B. The length 'L3' is greater than the offset distance 'L1' between the pivot pin 140 and the locking device 150 such that when the pivot arm 160 is engaged with the pivot pin 140, the second end 160B of the pivot arm 160 projects outward from the front end of the support member 130 to engage with the flange 116 of the plenum 104. The pivot arm 160 is designed in the form of an arc structure to provide rigidity to the construction thereof. The arc structure of the pivot arm 160 has a top surface 162, otherwise referred to as the convex surface, and a bottom surface 164, otherwise referred to as the concave surface, distal to the top surface 162. The pivot arm 160 has a thickness defined between the top surface 162 and the bottom surface 164, and has a width. The lateral distance 'L2' between the first leg 136 and the second leg 137 is greater than the width of the pivot arm 160 such that the pivot arm 160 is freely disposed between the first leg 136 and the second leg 137 and movably coupled to the pivot pin 140. The thickness and the width of the pivot arm 160 may be defined based on the height 'H' and the thickness 'T2' of the support member 130 and dimensional specifications of the locking device 150 and the pivot pin 140.

Figure 6:
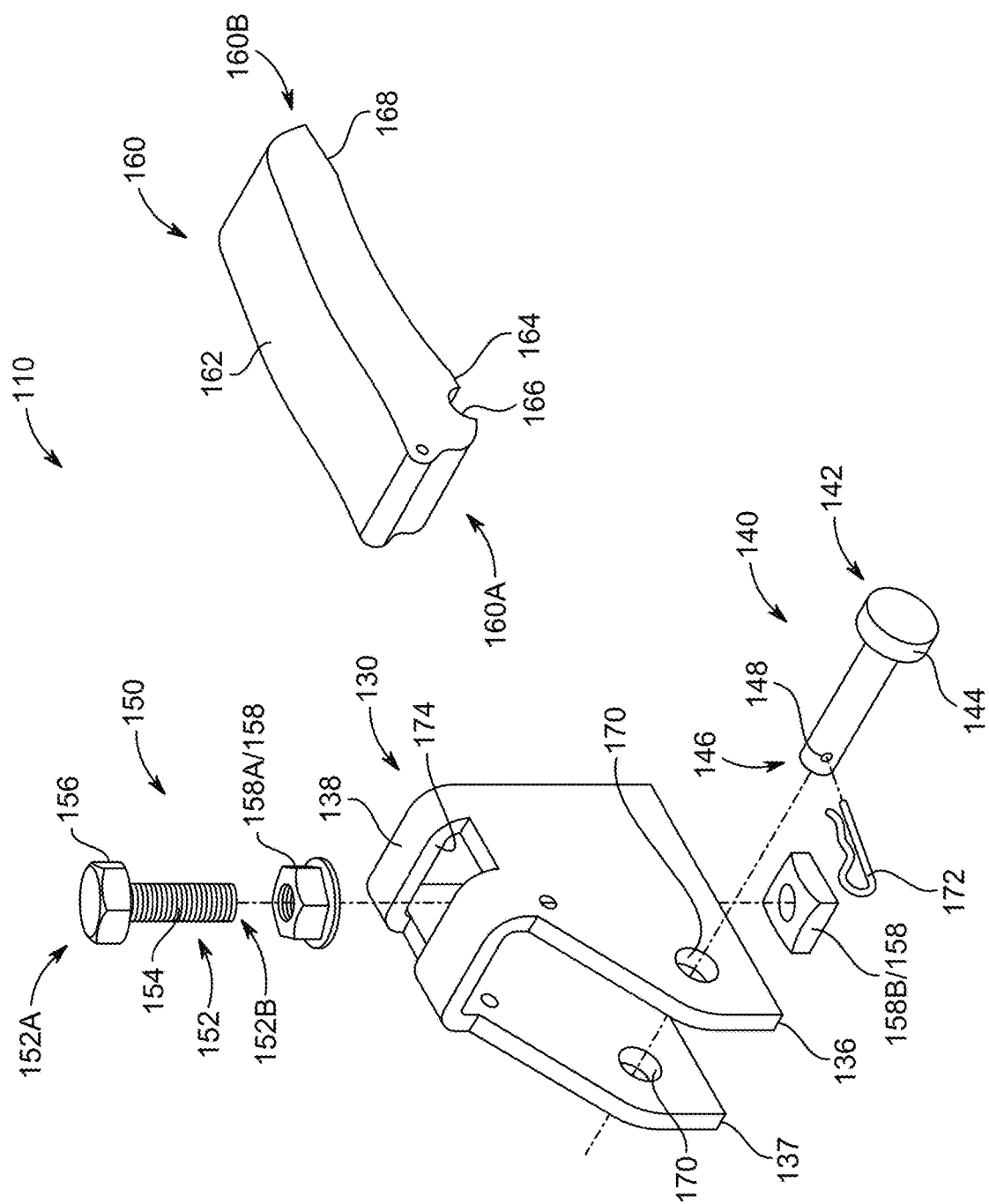
FIG. 6 is an exploded view of the fastening device, according to an embodiment of the present disclosure.

Referring to FIG. 6, an exploded view of the fastening device 110 is illustrated, according to an embodiment of the present disclosure. As shown in FIG. 5, the first end 160A of the pivot arm 160 defines a curved indentation 166 at the bottom surface 164. The curved indentation 166 has a diameter equal to or greater than a diameter of the pivot pin 140. Further, the curved indentation 166 of the pivot arm 160 is configured to movably engage with the pivot pin 140. The second end 160B of the pivot arm 160 defines a flat surface 168 configured to engage with a top surface 116A of the flange 116 of the plenum 104 when the shell 102 is coupled with the plenum 104. The flat surface 168 of the second end 160B of the pivot arm 160 helps to achieve increased contact area between the pivot arm 160 and the flange 116, and thereby to cause improved fluid tight contact between the plenum 104 and the shell 102. During assembly of the heat exchanger 100, the locking device 150 is configured to move the flange 116 of the plenum 104 towards the surface 135 of the connecting edge 112 using the pivot arm 160 to achieve fluid tight connection between the shell 102 and the plenum 104.

As shown in FIG. 4 and FIG. 6, each of the first leg 136 and the second leg 137 defines a hole 170 proximate the rear end thereof and the shoulder 138 is designed to support the locking device 150 proximate the front end. The holes 170 are configured to slidably receive the pivot pin 140 therethrough. Each hole 170 has a diameter greater than the diameter of the pivot pin 140 such that the pivot pin 140 is freely received through the holes 170. The pivot pin 140 includes a head end 142 having a cap 144 and a tail end 146 defining a through hole 148. The pivot pin 140 has a length greater than the thickness 'T2' of the support member 130 such that the tail end 146 of the pivot pin 140 is inserted through the holes 170 from one side of the support member 130 and projected outside from other side of the support member 130. The through hole 148 at the tail end 146 of the pivot pin 140 is configured to receive a cotter pin 172 therethrough such that the pivot pin 140 is removably coupled to the support member 130.

The locking device 150 includes a locking member 152 having a head end 152A and a tail end 152B. The locking member 152 includes a shank 154 defining the head end 152A and the tail end 152B. The locking member 152 further includes a head cap 156 at the head end 152A to receive an input from an operator such that the head end 152A of the locking member 152 is operated to engage the tail end 152B of the locking member 152 with the pivot arm 160. In one embodiment, the locking member 152 is a bolt, in such a case, the shank 154 is provided with threads and the head cap 156 is defined in the form of a bolt head. The head cap 156 may be operated using a fastening tool such as a spanner, a plier, or a wrench to engage the tail end 152B of the locking member 152 with the top surface 162 of the pivot arm 160. In some embodiments, the locking member 152 may be a device having the head end 152A configured to receive input from the operator and the tail end 152B may be configured to engage with the pivot arm 160.

The locking device 150 further includes a coupling member 158 configured to movably couple the locking member 152 with the support member 130. In one embodiment, the coupling member 158 may be associated with the locking member 152, and coupled to the support member 130 to allow movement of the locking member 152 in a vertical direction. In some embodiments, the coupling member 158 may be integrally formed with the support member 130 to allow movement of the locking member 152 in the vertical direction. In the present disclosure, the coupling member 158 includes a pair of nuts, namely a first nut 158A and a second nut 158B, configured to couple the locking member 152 with the support member 130 while allowing movement of the locking member 152 in the vertical direction. The coupling member 158 may also include one or more washers to improve strength of coupling between the locking device 150 and the support member 130.

The shoulder 138 includes a slot 174 configured to movably support the locking device 150 therewith. The slot 174 may have a shape selected from one of a rectangular shape, an oval shape, a circular shape, or any other polygon shape known in the art. In the present disclosure, the first nut 158A of the coupling member 158 is placed above the shoulder 138 and the second nut 158B is placed below the shoulder 138, thereby the locking member 152 is supported on the shoulder 138 while allowing movement of the locking member 152 in the vertical direction. In one embodiment, one of or both the first nut 158A and the second nut 158B may be welded to the shoulder 138. In some embodiments, the first nut 158A and the second nut 158B may be individually assembled with the locking member 152 while assembling the heat exchanger 100.

During an assembly of the heat exchanger 100, the shell 102 and the plenum 104 are aligned with each other to couple with the help of the fastening devices 110. The fastening devices 110 are coupled to the connecting edge 112 of the shell 102. In the present disclosure, the first leg 136 and the second leg 137 of the support member 130 are welded or otherwise coupled to the connecting edge 112 of the shell 102. Further, the flange 116 of the plenum 104 is placed on the connecting edge 112 of the shell 102. The gasket 124 is disposed between the plenum 104 and the shell 102 to provide fluid tight sealing therebetween. The pivot pin 140 is coupled to the support member 130 by inserting the tail end 146 of the pivot pin 140 through the holes 170 of the first leg 136 and the second leg 137. The cotter pin 172 is further inserted through the through hole 148 of the pivot pin 140. The pivot arm 160 is further disposed between the first leg 136 and the second leg 137 of the support member 130 and engaged the curved indentation 166 of the pivot arm 160 with the pivot pin 140. The second end 160B of the pivot arm 160 is placed on the top surface 116A of the flange 116 of the plenum 104. While placing the pivot arm 160, the locking member 152 may be kept at a raised position relative to the shoulder 138. After the pivot arm 160 is assembled, the head cap 156 of the locking member 152 is rotated to cause movement of the locking member 152 downward until the tail end 152B of the locking member 152 touches the top surface 162 of the pivot arm 160. The second end 160B of the pivot arm 160 rotates relative to the pivot pin 140 to cause angular movement. Further, a desired torque may be applied on the head cap 156 of the locking member 152 such that the locking member 152 moves the second end 160B of the pivot arm 160 further down to establish fluid tight coupling between the connecting edge 112 of the shell 102 and the flange 116 of the plenum 104. The gasket 124 may be compressed to form fluid tight sealing between the plenum 104 and the shell 102.

The present disclosure relates to the fastening device 110 and the heat exchanger 100 having the fastening device 110 for fluid tightly coupling the shell 102 and the plenum 104. The fastening device 110 includes the support member 130, the pivot pin 140 and the locking device 150 coupled to the support member 130, and the pivot arm 160 movably coupled to the pivot pin 140. The locking device 150 is engaged with the second end 160B of the pivot arm 160 such that when the locking member 152 is operated to move down, the second end 160B of the pivot arm 160 moves the flange 116 of the plenum 104 towards the connecting edge 112 of the shell 102 to establish fluid tight connection between the shell 102 and the plenum 104. Due to the constructional arrangement of the pivot arm 160 and the manner in which the support member 130 is coupled to the connecting edge 112 of the shell 102, the fastening device 110 of the present disclosure experiences less impact due to thermal stress. Further, the fastening device 110 of the present disclosure is free from operator error which is prevalent in the existing fastening method. Problems such as buckling of flange 116 in the existing fastening method is also avoided with the fastening device 110. Furthermore, the fastening device 110 facilitates hassle free maintenance compared to the existing fastening methods.

While aspects of the present disclosure have been particularly shown and described with reference to the embodiments above, it will be understood by those skilled in the art that various additional embodiments may be contemplated by the modification of the disclosed methods without departing from the spirit and scope of what is disclosed. Such embodiments should be understood to fall within the scope of the present disclosure as determined based upon the claims and any equivalents thereof.

What is claimed is:

1. A fastening device for fluid tightly coupling a first duct body and a second duct body of a heat exchanger, the fastening device comprising:
   a support member configured to couple with a connecting edge of the first duct body;
   a pivot pin coupled to the support member;
   a locking device coupled to the support member and disposed at an offset distance from the pivot pin along a radial axis of the fastening device; and
   a pivot arm having a first end configured to engage with the pivot pin and a second end configured to engage with a flange of the second duct body,
   wherein the support member comprises a bottom end configured to couple with the pivot pin and a top end configured to directly couple with the locking device, and
   wherein the locking device is configured to engage with the pivot arm and move the second end of the pivot arm relative to the pivot pin to fluid tightly engage the flange of the second duct body with the connecting edge of the first duct body.

2. The fastening device of claim 1, wherein the locking device is configured to move along a longitudinal axis perpendicular to the radial axis of the fastening device.

3. The fastening device of claim 1, wherein the support member is welded to the connecting edge of the first duct body.

4. The fastening device of claim 1, wherein the support member comprises:
   a first leg;
   a second leg disposed at a lateral distance to the first leg along a transverse axis perpendicular to the radial axis, wherein the first leg and the second leg are configured to couple with the connecting edge of the first duct body; and
   a shoulder extending between the first leg and the second leg along the transverse axis, wherein the shoulder is coupled to a top end of the first leg and a top end of the second leg, and wherein the locking device is movably coupled to the shoulder.

5. The fastening device of claim 4, wherein each of the first leg and the second leg defines a hole to slidably receive the pivot pin therethrough.

6. The fastening device of claim 5, wherein the pivot pin is removably coupled to the support member using a cotter pin.

7. The fastening device of claim 4, wherein the pivot arm is disposed between the first leg and the second leg and movably coupled to the pivot pin, and wherein the lateral distance between the first leg and the second leg is greater than a width of the pivot arm.

8. The fastening device of claim 4, wherein the shoulder comprises a slot configured to movably support the locking device therewith.

9. The fastening device of claim 1, wherein the locking device comprises:
   a locking member having a head end and a tail end; and
   a coupling member configured to movably couple the locking member with the support member,
   wherein the head end of the locking member is operable to engage the tail end of the locking member with the pivot arm.

10. The fastening device of claim 9, wherein the locking member comprises a bolt and the coupling member comprises a pair of nuts.

11. The fastening device of claim 1, wherein the first end of the pivot arm defines a curved indentation at a bottom surface thereof having a diameter equal to or greater than a diameter of the pivot pin, wherein the curved indentation of the pivot arm is movably engaged with the pivot pin.

12. The fastening device of claim 1, wherein the second end of the pivot arm defines a flat surface configured to engage with a top surface of the flange of the second duct body when the first duct body is coupled with the second duct body.

13. A heat exchanger comprising:
   a shell;
   a plenum configured to couple with the shell; and
   a plurality of fastening devices configured to fluid tightly engage the plenum with the shell, each of the plurality of fastening devices comprising:
      a support member configured to couple with the shell;
      a pivot pin coupled to the support member;
      a locking device coupled to the support member and disposed at an offset distance from the pivot pin along a radial axis of the fastening device; and
      a pivot arm having a first end configured to engage with the pivot pin and a second end configured to engage with the plenum,
      wherein the support member comprises a bottom end configured to couple with the pivot pin and a top end configured to directly couple with the locking device, and
      wherein the locking device is configured to engage with the pivot arm and move the second end of the pivot arm relative to the pivot pin to fluid tightly engage the plenum with the shell.

14. The heat exchanger of claim 13, wherein each of the plurality of fastening devices is coupled to a connecting edge of the shell at equal distance.

15. The heat exchanger of claim 13, wherein the support member of each of the plurality of fastening devices is welded to a connecting edge of the shell.

16. The heat exchanger of claim 15, wherein the connecting edge of the shell comprises an outer peripheral edge and an inner peripheral edge, and wherein the plurality of fastening devices is coupled to the connecting edge proximate the outer peripheral edge thereof.

17. The heat exchanger of claim 16, wherein the plenum comprises a flange having a peripheral edge portion configured to engage with a surface of the connecting edge proximate the inner peripheral edge thereof.

18. The heat exchanger of claim 17 further comprising, a gasket disposed between the flange of the plenum and the connecting edge of the shell.

19. The heat exchanger of claim 17, wherein the first end of the pivot arm defines a curved indentation configured to movably engage with the pivot pin and the second end of the pivot arm is configured to engage with the flange of the plenum, and wherein the locking device is configured to move the flange of the plenum towards the surface of the connecting edge using the pivot arm to achieve fluid tight connection between the shell and the plenum.

20. The heat exchanger of claim 13, wherein the pivot pin is removably coupled to the support member using a cotter pin.

\* \* \* \* \*